(12) United States Patent  
Muratani et al.

(10) Patent No.: US 12,017,676 B2
(45) Date of Patent: Jun. 25, 2024

(54) DRIVER MONITORING DEVICE, DRIVER MONITORING METHOD, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Ryosuke Muratani, Kanagawa (JP); Satoshi Shimizu, Kanagawa (JP); Shinya Ema, Kanagawa (JP); Kunio Fujikawa, Kanagawa (JP); Kento Mizuta, Kanagawa (JP); Yucheng(Leo) Zhang, Kanagawa (JP); Kisei Takada, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 34 days.

(21) Appl. No.: 18/072,352

(22) Filed: Nov. 30, 2022

(65) Prior Publication Data

US 2023/0182762 A1 Jun. 15, 2023

(30) Foreign Application Priority Data

Dec. 10, 2021 (JP) ................................. 2021-200980

(51) Int. Cl.
*G08B 23/00* (2006.01)
*B60W 40/08* (2012.01)
(Continued)

(52) U.S. Cl.
CPC ............ *B60W 50/14* (2013.01); *B60W 40/08* (2013.01); *G06V 20/597* (2022.01);
(Continued)

(58) Field of Classification Search
CPC ................ B60W 50/14; B60W 40/08; B60W 2040/0827; B60W 2050/143;
(Continued)

(56) References Cited

U.S. PATENT DOCUMENTS 10,160,426 B2 * 12/2018 Nagai ....................... B60C 9/00
10,803,294 B2 * 10/2020 Matsumura ........... B60W 50/14
(Continued)

FOREIGN PATENT DOCUMENTS

| JP | 2016-038793 | 3/2016 |
|---|---|---|
| JP | 6350312 | 7/2018 |

*Primary Examiner* — Anh V La
(74) *Attorney, Agent, or Firm* — Greenblum & Bernstein, P.L.C.

(57) ABSTRACT

A driver monitoring device includes: a processor; and a memory. The memory stores instructions, when executed by the processor, cause the driver monitoring device to perform operations including: detecting an unbalanced posture of a driver based on an image of a driver's seat; determining whether the unbalanced posture is a habitual unbalanced posture of the driver; calculating an opening degree of at least one eye of the driver based on the image in a case in which it is determined that the unbalanced posture is other than the habitual unbalanced posture; determining whether it is a timing to give a notification in a case in which the vehicle is traveling and the opening degree is equal to or larger than a first threshold; and giving the notification to the driver in a case in which it is determined that it is the timing to give the notification.

15 Claims, 5 Drawing Sheets (51) Int. Cl.
*B60W 50/14* (2020.01)
*G06V 20/59* (2022.01)
*G06V 40/10* (2022.01)
*G06V 40/16* (2022.01)
*G06V 40/18* (2022.01)

(52) U.S. Cl.
CPC .......... *G06V 40/103* (2022.01); *G06V 40/174* (2022.01); *G06V 40/18* (2022.01); *B60W 2040/0827* (2013.01); *B60W 2050/143* (2013.01); *B60W 2050/146* (2013.01); *B60W 2420/403* (2013.01); *B60W 2540/21* (2020.02); *B60W 2540/223* (2020.02); *B60W 2540/229* (2020.02)

(58) Field of Classification Search
CPC ..... B60W 2050/146; B60W 2420/403; B60W 2540/21; B60W 2540/223; B60W 2540/229; B60W 50/0097; B60W 2556/50; B60W 2040/089; G06V 20/597; G06V 40/103; G06V 40/174; G06V 40/18; B60Y 2302/05
USPC ................. 340/576, 575, 573.1, 439, 457
See application file for complete search history.

(56) References Cited

U.S. PATENT DOCUMENTS

| | | | |
|---|---|---|---|
| 10,977,507 B2 * | 4/2021 | An ........................ | B60R 22/48 |
| 11,345,298 B2 * | 5/2022 | Yoshizawa ............... | B62D 1/04 |
| 2017/0161575 A1 * | 6/2017 | Banno .................... | A61B 5/163 |
| 2017/0210357 A1 | 7/2017 | Nagai | |

\* cited by examiner

| TYPE | NOTIFICATION TIMING | INFORMATION TO BE USED |
|---|---|---|
| TAKE REST | CURRENT POSITION OF VEHICLE IS BEFORE REST PLACE BY PREDETERMINED DISTANCE (SEVERAL KILOMETERS) | CURRENT POSITION, ROUTE AND MAP |
| ALERT DRIVER | CURRENT POSITION OF VEHICLE IS BEFORE FREQUENT ACCIDENT OCCURRENCE POINT BY PREDETERMINED DISTANCE (SEVERAL HUNDRED METERS) | CURRENT POSITION, ROUTE, MAP AND ACCIDENT HISTORY |
| ALERT DRIVER | WHEN DRIVER IS ABSORBED IN CONVERSATION | CAMERA AND MICROPHONE IN VEHICLE |

DRIVER MONITORING DEVICE, DRIVER MONITORING METHOD, AND NON-TRANSITORY COMPUTER-READABLE MEDIUM

TECHNICAL FIELD

The present disclosure relates to a driver monitoring device, a driver monitoring, and a non-transitory computer-readable medium.

BACKGROUND ART

JP2016-038793A discloses a driver monitoring device that detects an unbalanced posture of a driver based on a camera image, determines whether the detected unbalanced posture of the driver is a habitual unbalanced posture of the driver, and notifies the driver of the unbalanced posture in different manners in accordance with whether the unbalanced posture is determined to be the habitual unbalanced posture of the driver or the unbalanced posture is determined to be other than the habitual unbalanced posture of the driver. In addition, the driver monitoring device disclosed in JP2016-038793A determines whether eye-closing time of the driver is longer than a predetermined time when the posture of the driver is not improved after it is determined that the unbalanced posture is other than the habitual unbalanced posture and the driver is alerted, safely stops the vehicle when the eye-closing time of the driver is longer than the predetermined time, determines whether the vehicle is stopped next when the eye-closing time of the driver is less than the predetermined time, and presents information about an appropriate driving posture and effects of the unbalanced posture to the driver when the vehicle is stopped.

SUMMARY OF INVENTION

The driver monitoring device disclosed in JP2016-038793A does not notify the driver until the vehicle stops when the driver has a posture other than the habitual unbalanced posture and the eye-closing time of the driver is less than the predetermined time. However, even in such a case, it may be better to notify the driver at an appropriate timing according to a situation.

An object of the present disclosure is to provide a driver monitoring device, a driver monitoring, and a non-transitory computer-readable medium capable of notifying a driver at an appropriate timing according to a situation.

The present disclosure provides a driver monitoring device including: a processor; and a memory storing instructions that, when executed by the processor, cause the driver monitoring device to perform operations, the operations including: detecting an unbalanced posture of a driver based on an image of a driver's seat of a vehicle captured by a camera; determining whether the unbalanced posture of the driver is a habitual unbalanced posture of the driver; calculating an opening degree of at least one eye of the driver based on the image in a case in which it is determined that the unbalanced posture is other than the habitual unbalanced posture of the driver; determining whether it is a timing to give a notification to the driver in a case in which the vehicle is traveling and the opening degree is equal to or larger than a first threshold; and giving the notification to the driver in a case in which it is determined that it is the timing to give the notification.

The present disclosure provides a driver monitoring method including: detecting an unbalanced posture of a driver based on an image of a driver's seat of a vehicle captured by a camera; determining whether the unbalanced posture of the driver is a habitual unbalanced posture of the driver; calculating an opening degree of at least one eye of the driver based on the image in a case in which it is determined that the unbalanced posture is other than the habitual unbalanced posture of the driver; determining whether it is a timing to give a notification to the driver in a case in which the vehicle is traveling and the opening degree is equal to or larger than a first threshold; and giving the notification to the driver in a case in which it is determined that it is the timing to give the notification. Further, the present disclosure provides a non-transitory computer-readable medium that stores a driver monitoring program, the driver monitoring program, when executed by a processor, causing a computer to perform a process, the process including: detecting an unbalanced posture of a driver based on an image of a driver's seat of a vehicle captured by a camera; determining whether the unbalanced posture of the driver is a habitual unbalanced posture of the driver; calculating an opening degree of at least one eye of the driver based on the image in a case in which it is determined that the unbalanced posture is other than the habitual unbalanced posture of the driver; determining whether it is a timing to give a notification to the driver in a case in which the vehicle is traveling and the opening degree is equal to or larger than a first threshold; and giving the notification to the driver in a case in which it is determined that it is the timing to give the notification.

These general or specific modes may be realized by a system, a device, a method, an integrated circuit, a computer program, or a recording medium, or may be realized by any combination of a system, a device, a method, an integrated circuit, a computer program, and a recording medium.

According to the present disclosure, it is possible to provide the driver monitoring device, a driver monitoring, and a non-transitory computer-readable medium capable of notifying a driver at an appropriate timing according to a situation.

DESCRIPTION OF EMBODIMENTS

Hereinafter, an embodiment of the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the claimed subject matter described in the claims.

Embodiment

<Configuration of Driver Monitoring Device>

Figure 1:
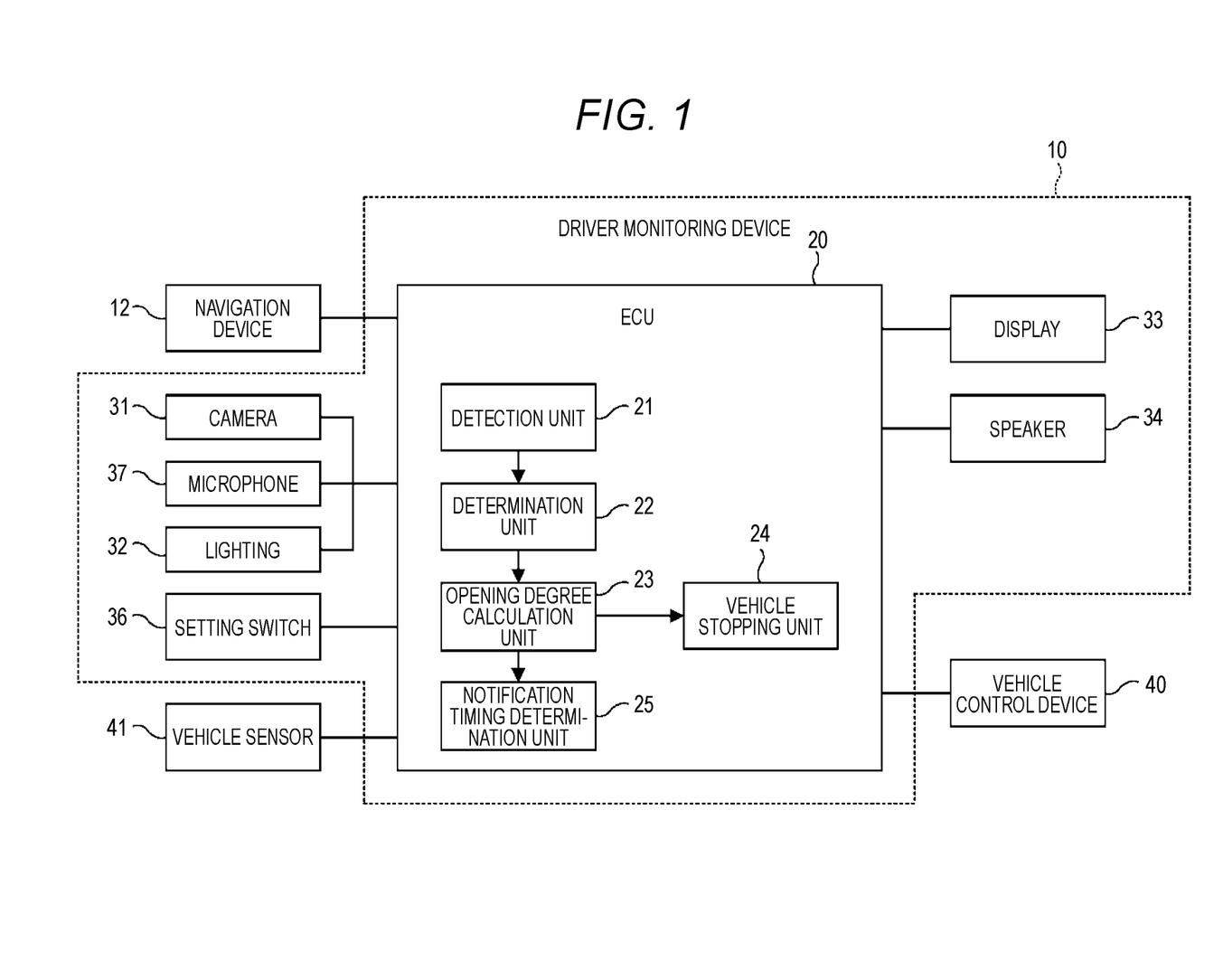
FIG. 1 is a diagram illustrating a configuration example of a driver monitoring device according to an embodiment.
Figure 2:
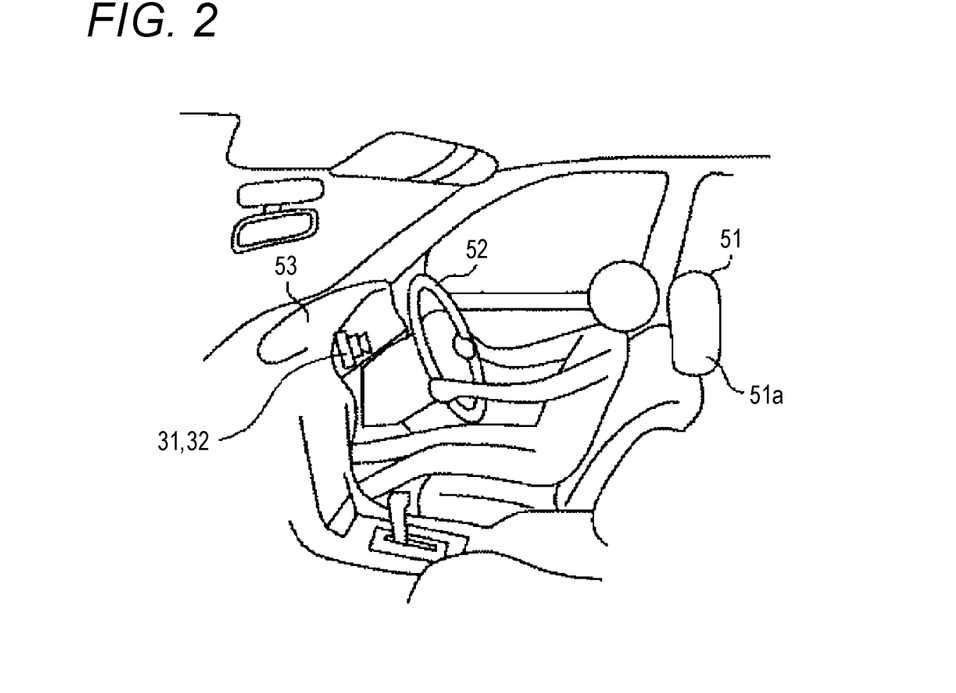
FIG. 2 is a diagram illustrating an interior of a vehicle equipped with the driver monitoring device according to the present embodiment.

A configuration of a driver monitoring device 10 according to the present embodiment will be described with reference to FIGS. 1 and 2. FIG. 1 is a diagram illustrating a configuration example of a driver monitoring device according to the present embodiment. FIG. 2 is a diagram illustrating an interior of a vehicle equipped with the driver monitoring device according to the present embodiment.

The driver monitoring device 10 includes an electronic control unit (ECU) 20, a camera 31, lighting 32, a microphone 37, a setting switch 36, a display 33, and a speaker 34.

The camera 31 is, for example, a charge coupled device (CCD) camera, and is a camera having high sensitivity characteristics in a near-infrared region. The lighting 32 including, for example, near-infrared light emitter diodes (LEDs) is for emitting near-infrared light and is installed in a vicinity of the camera 31. The microphone 37 may be installed in a vicinity of the camera 31.

As illustrated in FIG. 2, the camera 31 is installed in a meter hood 53, and captures an image of a driver's seat in the interior of the vehicle illuminated by the lighting 32. Specifically, the lighting 32 emits near-infrared light toward a periphery of a headrest 51a of a driver's seat 51 and the camera 31 captures an image of the periphery of the headrest 51a illuminated by the lighting 32. That is, when a driver is seated on the driver's seat, the camera 31 captures an image of a driver's face and a periphery thereof. Every time the camera 31 captures one frame of image data, the camera 31 transmits the image data to the ECU 20. As long as the image of the face and the periphery of the driver seated on the seat 51 can be captured, the camera 31 may be installed over a dashboard, a steering column, an A-pillar, or the like. In addition, the camera 31 may include a plurality of cameras, and the plurality of cameras may be installed at different locations. The microphone 37 collects a conversation between the driver and a passenger in the interior of the vehicle, and transmits voice data to the ECU 20.

The ECU 20 is a device for performing a monitoring process of the driver. Therefore, the ECU 20 may be read as a driver monitoring ECU. The ECU 20 is a microcomputer including a central processing unit (CPU), a read only memory (ROM), a random access memory (RAM), an input/output (I/O), and the like, and realizes functions of a detection unit 21, a determination unit 22, an opening degree calculation unit 23, a vehicle stopping unit 24, and a notification timing determination unit 25. In addition, the ECU 20 adjusts an amount of light of the lighting 32 in accordance with a time zone or the like so that the image of the driver face can be easily captured. Next, each of the above functions will be described.

Figure 3:
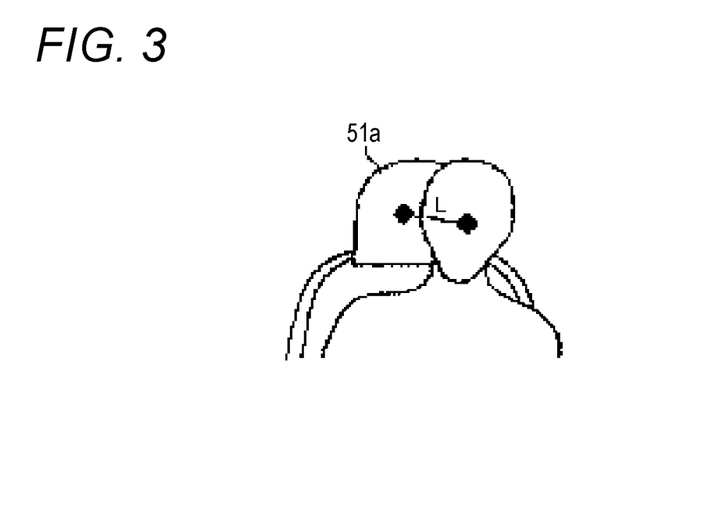
FIG. 3 is a diagram illustrating an example of a posture unbalance magnitude according to the present embodiment.

The detection unit 21 detects an unbalanced posture of a driver based on the image captured by the camera 31. Specifically, the detection unit 21 recognizes an image captured by the camera 31 and calculates a posture unbalance magnitude L. The posture unbalance magnitude L may be defined appropriately. For example, as illustrated in FIG. 3, a distance between a center of the headrest 51a set as a reference point and a center of the driver's face may be defined as the posture unbalance magnitude L. Instead of the center of the headrest 51a, a center of a steering wheel 52 may be set as a reference point. Alternatively, the center of the face of the driver who sits on the seat 51 in an appropriate posture facing the front may be registered as a reference point, and the distance between this reference point and the center of the driver's face recognized from the image may be set as the posture unbalance magnitude L.

When the posture unbalance magnitude L is larger than a threshold value Th, the detection unit 21 detects an unbalanced posture of the driver. The threshold value Th is set, for example, to be a boundary value for allowing proper and effective operation of an airbag at the time of a collision. That is, the threshold value Th is set to such a value that when the posture unbalance magnitude L is larger than the threshold value Th, the proper and effective operation of an airbag is difficult. The airbag may be, for example, a driver seat airbag to be deployed over the steering wheel 52 or a side airbag to be deployed between the seat 51 and a door panel. In a case of the driver seat airbag, for example, when the driver's head projected on an upper surface of the steering wheel 52 is not inside an airbag deployment area, the airbag cannot be properly effective at the time of a collision. In addition, when a distance between the airbag and the driver's head is too short, deployment of the airbag subjects the driver's head to a strong impact. This prevents the airbag from being properly effective at the time of a collision. The threshold value Th may be set to be appropriate for the location where the airbag is installed and a size of the airbag. Different threshold values Th may be set for different directions of unbalanced postures, that is, for different directions of postures shifting from an appropriate driving posture.

The determination unit 22 determines whether the unbalanced posture of the driver detected by the detection unit 21 is a habitual unbalanced posture of the driver. When a driver is in an appropriate posture, the posture unbalance magnitude L is smaller than the threshold value Th. When the unbalanced posture of the driver is the habitual unbalanced posture, the posture unbalance magnitude L is kept larger than the threshold value Th continuously from immediately after start of driving. When the unbalanced posture of the driver is due to fatigue or reduced attentiveness of the driver, the posture unbalance magnitude L increases with time although the posture unbalance magnitude L is small immediately after the start of driving. In this case, after exceeding the threshold value Th, the posture unbalance magnitude L stays being larger than the threshold value Th. When the unbalanced posture of the driver is the habitual unbalanced posture of the driver, it is not necessary to immediately alert the driver. However, when the driver stays in the unbalanced posture, his/her fatigue easily accumulates, so that it is desirable to urge the driver to correct his/her posture. On the other hand, when the unbalanced posture of the driver is due to fatigue or reduced attentiveness of the driver, the unbalanced posture may lead to an accident, so that it is necessary to immediately alert the driver and urge the driver to take a rest.

When the unbalanced posture of the driver is continuously detected by the detection unit 21 for a period longer than time T1 (posture unbalance determination time) from immediately after driving is started (from within a predetermined time after driving is started), the determination unit 22 determines that the unbalanced posture is the habitual unbalanced posture of the driver. In addition, when the posture unbalance magnitude L exceeds the threshold value Th by increasing with driving time from a value equal to or smaller than the threshold value Th, the determination unit 22 determines that the unbalanced posture is due to fatigue or reduced attentiveness of the driver, that is, that the unbalanced posture is other than the habitual unbalanced posture of the driver. Alternatively, when, after a predetermined time elapses from the start of driving, the unbalanced posture of the driver is continuously detected by the detection unit 21 for a period longer than the time T1, the determination unit 22 determines that the unbalanced posture is other than the habitual unbalanced posture of the driver.

When the determination unit 22 determines that the unbalanced posture is the habitual unbalanced posture of the driver, the determination unit 22 instructs the display 33 and the speaker 34 to present posture information at predetermined timing. When the determination unit 22 determines that the unbalanced posture is other than the habitual unbalanced posture of the driver, the determination unit 22 instructs the display 33 and the speaker 34 to immediately alert the driver. When the posture unbalance magnitude L after sharply increasing to over the threshold value Th decreases to or below the threshold value L before the time T1 elapses, the driver is supposed to have regained an appropriate posture, for example, after once looking aside, so that it is not necessary to notify the driver of the unbalanced posture.

In cases where, after the unbalanced posture is determined to be other than the habitual unbalanced posture of the driver and the driver is alerted, the driver's posture is not improved and the driver's eyes are closed, the driver may be in a state of being unable to drive due to loss of consciousness or the like. Hence, the opening degree calculation unit 23 recognizes the image captured by the camera 31 and calculates an opening degree of the driver's eyes. The opening degree calculation unit 23 may calculate an opening degree of at least one eye of the driver. The opening degree of an eye is calculated based on a distance between opposing edges of the top and bottom eyelids of the eye.

When, after the unbalanced posture is determined to be other than the habitual unbalanced posture of the driver and the driver is alerted, the driver's posture is not improved and the driver's eyes are determined to be closed, the vehicle stopping unit 24 transmits a signal for safely stopping the vehicle to a vehicle control device 40. The vehicle stopping unit 24 determines that the driver's eyes are closed, when a period during which the opening degree of eyes of the driver calculated by the opening degree calculation unit 23 remains smaller than a threshold value Tho (opening degree threshold value; an example of a first threshold) is longer than time T2 (opening degree determination time; an example of a fourth threshold).

When the vehicle is traveling and the opening degree of eyes of the driver calculated by the opening degree calculation unit is equal to or larger than the threshold value Tho (opening degree threshold value), the notification timing determination unit 25 determines whether it is a timing to give a predetermined notification to the driver. The notification timing determination unit 25 will be described in detail later.

The display 33 (notification unit) is a display of an in-vehicle information terminal or an in-vehicle display provided in a meter panel. The display 33 may be a touch display including a liquid crystal panel or an organic EL panel.

The speaker 34 (notification unit) is an in-vehicle speaker used, for example, along with an in-vehicle information terminal and an in-vehicle audio device.

The display 33 and the speaker 34 notify the driver of an unbalanced posture in different manners in accordance with whether the determination unit 22 determines that the unbalanced posture is the habitual unbalanced posture of the driver or the determination unit 22 determines that the unbalanced posture is other than the habitual unbalanced posture of the driver. Specifically, when the unbalanced posture is the habitual unbalanced posture of the driver, the display 33 and the speaker 34 present the posture information at timing when the vehicle stops. The posture information is information for urging the driver to correct his/her posture and preferably includes information either about an appropriate driving posture or about effects of the unbalanced posture. In addition, when the unbalanced posture is other than the habitual unbalanced posture of the driver, the display 33 and the speaker 34 immediately alert the driver. When the unbalanced posture is other than the habitual unbalanced posture of the driver and the notification timing determination unit 25 determines that it is the timing to give the notification, the display 33 and the speaker 34 may give the predetermined notification to the driver.

The setting switch 36 (setting unit) is a switch for use by a driver to set a frequency at which the posture information is presented. The setting switch 36 may be a mechanical switch or a touch switch formed integrally on the display 33. Depending on the driver, frequent presentation of the posture information after the unbalanced posture is determined to the habitual unbalanced posture of the driver may be annoying. The setting switch 36 allows such a driver to set a desired frequency of posture information output, for example, to have posture information outputted only once in a trip of driving or once in several hours.

<Processing Procedure for Posture Unbalance Notification>

Figure 4:
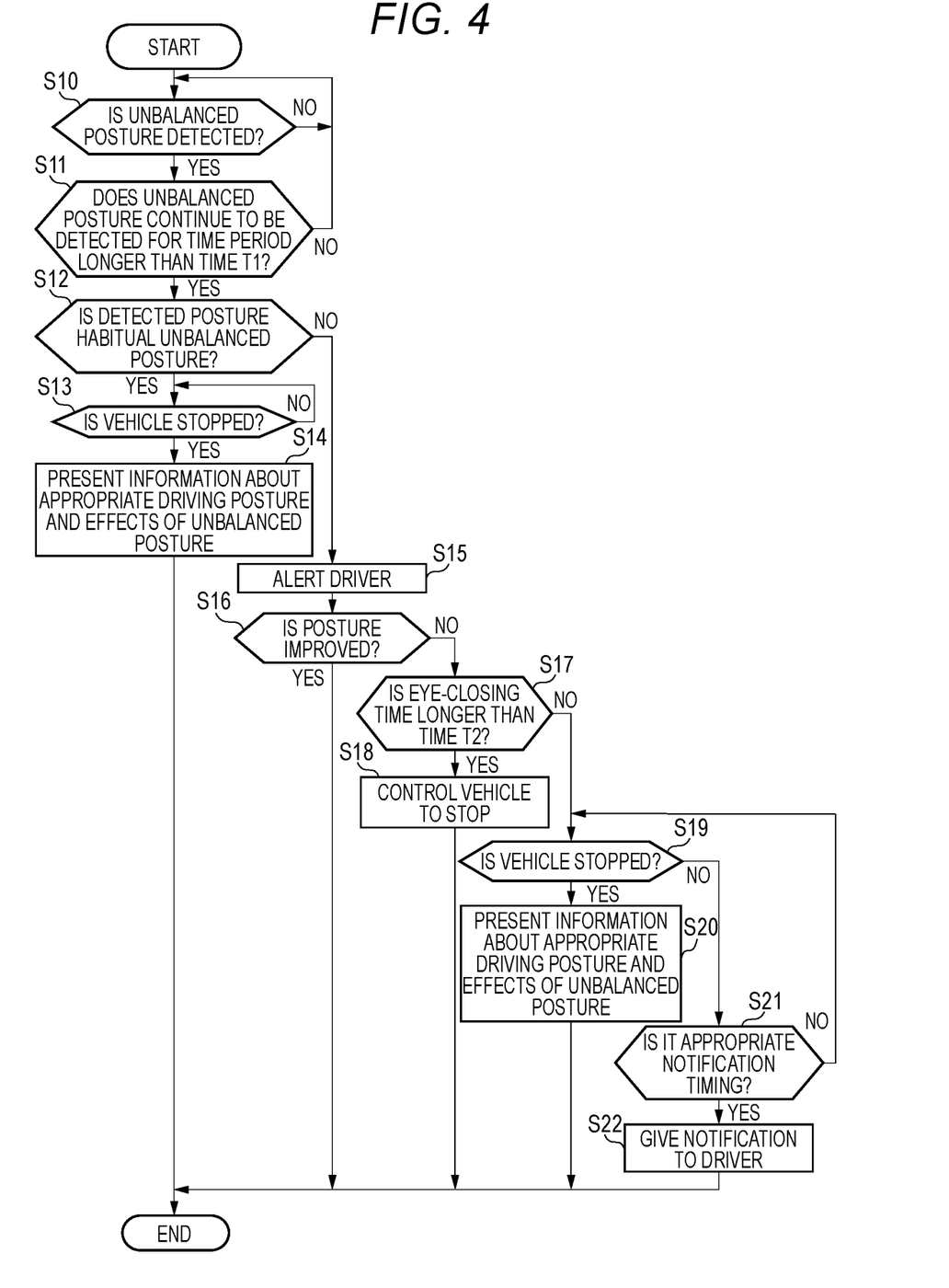
FIG. 4 is a flowchart illustrating a processing procedure for a posture unbalance notification according to the present embodiment.

Next, with reference to FIG. 4, a processing procedure for a posture unbalance notification will be described. FIG. 4 is a flowchart illustrating a processing procedure for the posture unbalance notification. The processing procedure is executed by the ECU 20. The processing procedure may be repeatedly executed.

The ECU 20 determines whether the unbalanced posture is detected (S10). That is, the ECU 20 determines whether the posture unbalance magnitude L is larger than the threshold value Th.

When no unbalanced posture is detected (S10: NO), the ECU 20 repeatedly executes processing of step S10.

When the unbalanced posture is detected (S10: YES), the ECU 20 determines whether the unbalanced posture has been detected continuously for a time period longer than the time T1 (S11).

When the unbalanced posture has not been detected continuously for a time period longer than the time T1 (S11: NO), the ECU 20 returns to the processing of step S10.

When the unbalanced posture has been detected continuously for a time period longer than the time T1 (S11: YES), the ECU 20 determines whether the unbalanced posture is the habitual unbalanced posture of the driver (S12). When the unbalanced posture has been detected from the time immediately after the vehicle is started, that is, when the unbalanced posture has been detected for a time period longer than the time T1 from the time immediately after the vehicle is started, the ECU 20 may determine that the unbalanced posture is the habitual unbalanced posture of the driver (that is, S12: YES). When the unbalanced posture has not been detected from the time immediately after the vehicle is started, that is, when the unbalanced posture has been detected continuously for a time period longer than the time T1 not from immediately after the vehicle is started but from some time after the vehicle is started, the ECU 20 may determine that the unbalanced posture is other than the habitual unbalanced posture of the driver (that is, S12: NO).

In the present case, "immediately after the vehicle is started" means "within a predetermined time after a shift position is changed from a parking position" or "within a predetermined time after traveling of the vehicle is started". The shift position and starting of the traveling are determined based on a detection value of a vehicle sensor 41.

When the unbalanced posture is determined to be the habitual unbalanced posture of the driver (S12: YES), the ECU 20 determines whether the vehicle is stopped (S13). For example, the ECU 20 determines whether a vehicle speed is equal to or lower than a threshold value V km/h based on the detection value of the vehicle sensor 41, and determines whether the vehicle is stopped based on the determination result. The threshold value "V km/h" may represent either 0 km/h (vehicle completely stopped) or a speed low enough (for example, 1 km/h) for the vehicle to be regarded as stopped.

When it is determined that the vehicle is not stopped (S13: NO), the ECU 20 repeatedly executes processing of step S13.

When it is determined that the vehicle is stopped (S13: YES), the ECU 20 presents information about an appropriate driving posture and effects of the unbalanced posture (S14) An example of a method of presenting the information about an appropriate driving posture and effects of the unbalanced posture will be described later. Then, the ECU 20 ends the present process.

Next, a case where it is determined in step S12 that the unbalanced posture is other than the habitual unbalanced posture of the driver (S12: NO) will be described.

When it is determined that the unbalanced posture is other than the habitual unbalanced posture of the driver (S12: NO), the ECU 20 immediately alerts the driver (S15). For example, the ECU 20 outputs an alarm sound from the speaker 34. Alternatively, the ECU 20 causes the display 33 to display an alarm message, for example, "Please take a rest" and causes the speaker 34 to voice-output the message.

The ECU 20 determines whether the driver's posture is improved (S16). When the posture unbalance magnitude L becomes equal to or smaller than the threshold value Th, the ECU 20 determines that the driver's posture is improved (S16: YES). Then, the ECU 20 ends the present process.

When the posture unbalance magnitude L is kept being larger than the threshold value Th, the ECU 20 determines that the posture of the driver is not improved (S16: NO), and then determines whether a period during which the eyes of the driver are closed (hereinafter, referred to as "eye-closing time") is longer than a predetermined threshold time T2 (S17). For example, the ECU 20 determines whether a state in which the eye opening degree of the driver is smaller than the threshold value Tho (that is, a state in which the eyes are closed) continues for a period longer than the threshold time T2.

When the eye-closing time of the driver is longer than the threshold value time T2 (S17: YES), the ECU 20 issues an instruction to the vehicle control device 40 to safely stop the vehicle through appropriate braking and steering. In addition, in order to inform vehicles in the vicinity of a dangerous condition, the ECU 20 issues instructions to the vehicle control device 40 to light the headlights and sound the horn. Further, in order to inform other passengers of the vehicle about the dangerous condition, the ECU 20 issues an instruction to the speaker 34 to output an alarm sound.

When the eye-closing time of the driver is less than the threshold value time T2 (S17: NO), the ECU 20 determines whether the vehicle is stopped as in the processing of step S13 (S19).

When it is determined that the vehicle is stopped (S19: YES), the ECU 20 presents the information about an appropriate driving posture and effects of the unbalanced posture as in processing of S14 (S20). An example of a method of presenting the information about an appropriate driving posture and effects of the unbalanced posture will be described later. Then, the ECU 20 ends the present process.

When it is determined that the vehicle is not stopped (that is, the vehicle is traveling) (S19: NO), the ECU 20 determines whether it is an appropriate notification timing (S21). A method of determining whether it is an appropriate notification timing will be described later. When it is not an appropriate notification timing (S20: NO), the ECU 20 returns to processing of S19.

When it is an appropriate notification timing (S20: YES), the ECU 20 gives the predetermined notification to the driver (S22). Details of the predetermined notification will be described later. Then, the ECU 20 ends the present process.

<Presentation Example of Appropriate Driving Posture>

Next, an example of a method of presenting the information about an appropriate driving posture and effects of the unbalanced posture in step S14 or step S20 illustrated in FIG. 4 will be described.

For example, the ECU 20 causes the display 33 to display an illustration illustrating a correct driving posture, causes the display 33 to display a procedure of taking the correct driving posture, and causes the speaker 34 to output a voice.

Further, the ECU 20 may change and present the contents of the posture information depending on the type of the habitual unbalanced posture. For example, the ECU 20 may classify the habitual unbalanced posture of the driver may be classified into types, for example, lean-forward, overly relaxed (bent backwards) and leaning against a door, and may present the posture information corresponding to classified types of the unbalanced posture.

For classification of the types of the unbalanced posture, a table in which the types of the unbalanced posture are classified in advance can be prepared and a driver's posture detected by image recognition can be compared with the table. Another method may also be used to classify types of the unbalanced posture.

<Method of Determining Appropriate Notification Timing and Notification Method>

Next, an example of determination of the appropriate notification timing in step S21 illustrated in FIG. 4 and an example of the predetermined notification to the driver in step S22 will be described with reference to FIGS. 5 to 8.

Figure 5:
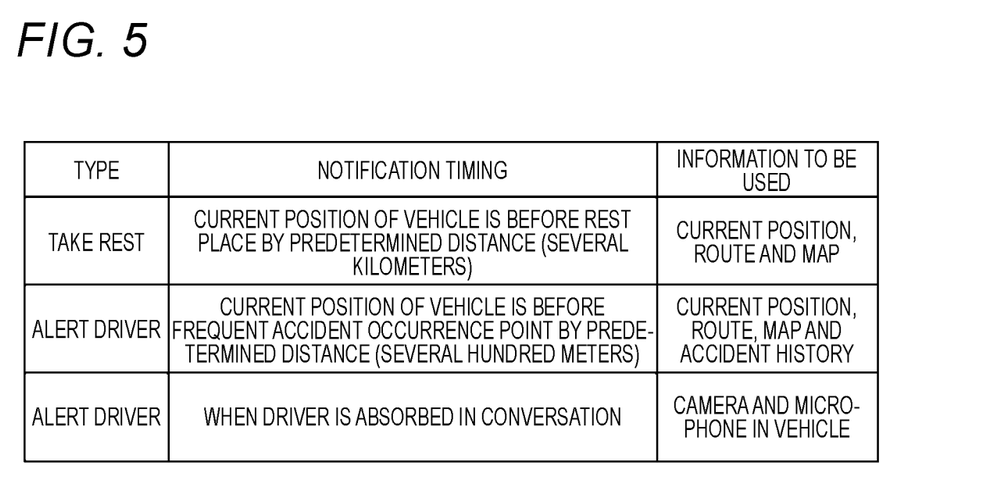
FIG. 5 is a diagram illustrating an example of a method for determining an appropriate notification timing according to the present embodiment.
Figure 6:
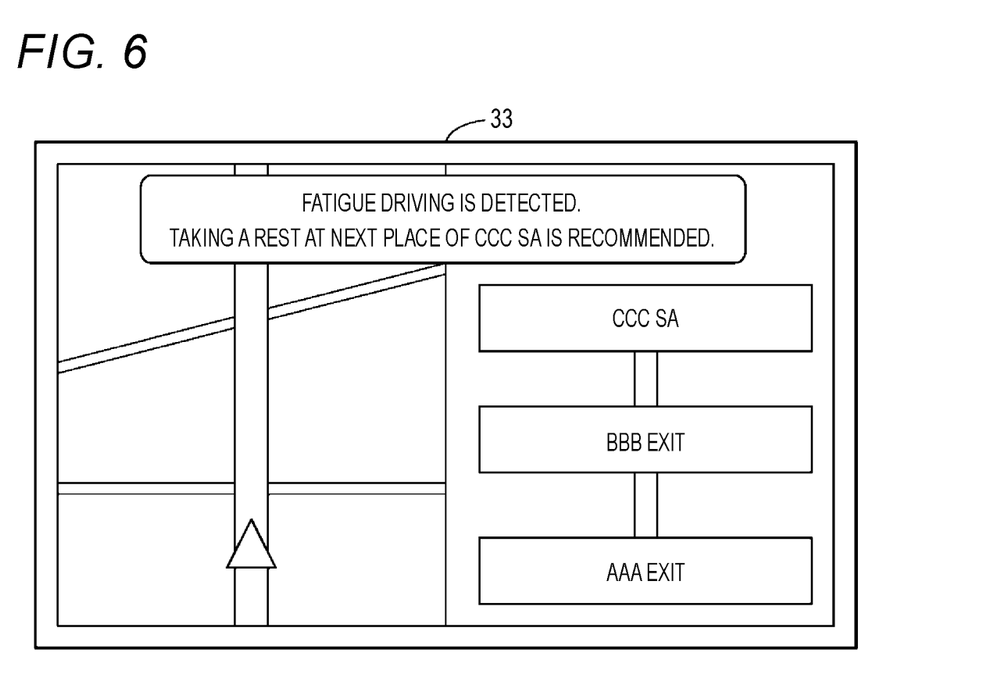
FIG. 6 is a diagram illustrating an example of a notification for urging a driver to take a rest according to the present embodiment.
Figure 7:
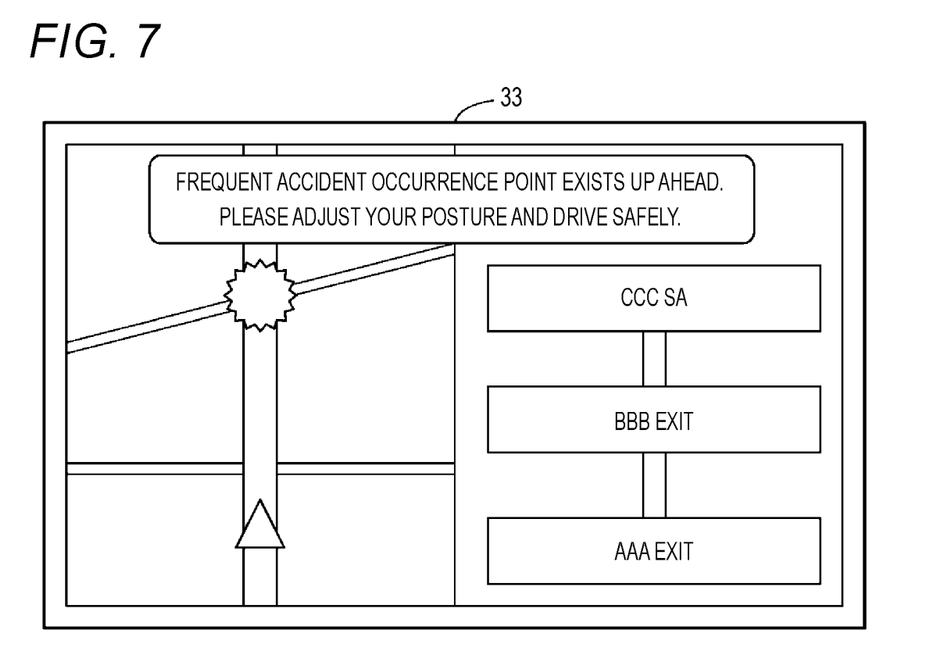
FIG. 7 is a diagram illustrating an example of a notification for urging a driver to perform safe driving according to the present embodiment.
Figure 8:
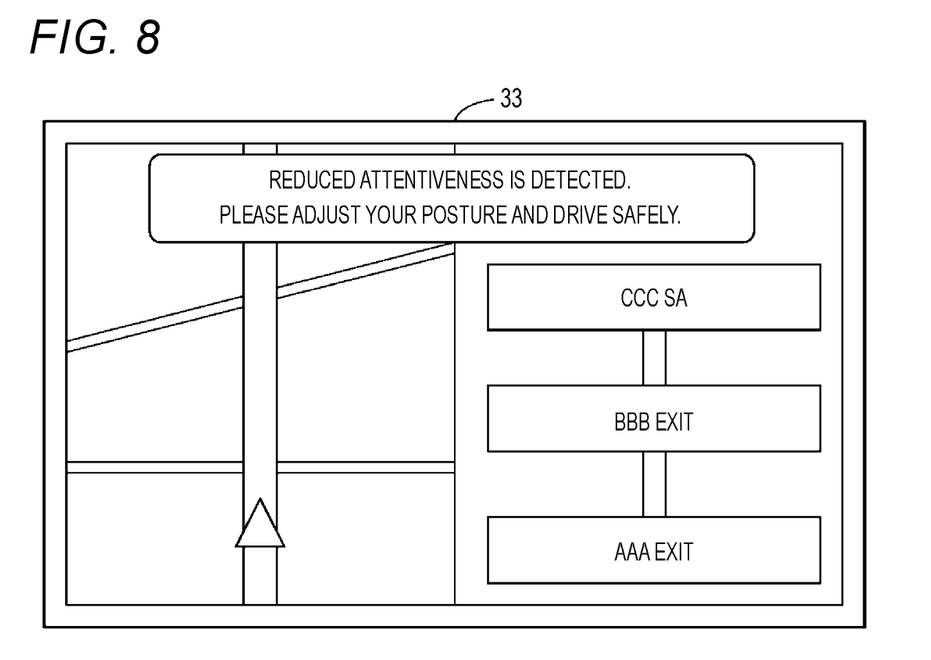
FIG. 8 is a diagram illustrating an example of a notification for urging a driver to concentrate on driving according to the embodiment.

FIG. 5 is a diagram (table) illustrating an example of the method for determining the appropriate notification timing according to the present embodiment. FIG. 6 is a diagram illustrating an example of a notification for urging the driver to take a rest according to the present embodiment. FIG. 7 is a diagram illustrating an example of a notification for urging the driver to perform safe driving according to the present embodiment. FIG. 8 is a diagram illustrating an example of a notification for urging the driver to concentrate on driving according to the present embodiment.

As illustrated in a first row of the table of FIG. 5, in step S21, the ECU 20 (notification timing determination unit 25)

determines that it is the timing to give the notification when a distance from the current position of the vehicle to a rest place present on a preset route on which the vehicle is scheduled to travel is less than a predetermined threshold value (an example of a second threshold; for example, several kilometers). The current position of the vehicle may be specified by a positioning device (for example, a reception device of a global navigation satellite system (GNSS) signal) mounted on the vehicle. The route along which the vehicle is scheduled to travel may be set in advance in a navigation device 12. Examples of the rest place include a service area (SA) or a parking area (PA) on an expressway, a station or a parking lot on a road on a general road, and the like. In this case, in step S22, the ECU 20 notifies the driver of information for urging the driver to take a rest at a next rest place. For example, as illustrated in FIG. 6, the ECU 20 may display, on the display 33, information for urging the driver to take a rest at the next rest place, and may output, from the speaker 34, a voice for urging the driver to take a rest. In this case, the ECU 20 may set, in the navigation device 12, a route with the next rest place as a relay point.

As illustrated in a second row of the table of FIG. 5, in step S21, the ECU 20 (notification timing determination unit 25) determines that it is the timing to give the notification when a distance from the current position of the vehicle to a place where attention should be paid to traveling present on a preset route on which the vehicle is scheduled to travel is less than a predetermined threshold value (an example of a third threshold, for example, several hundred meters). Examples of the place to be carefully noted include a frequent accident occurrence point, an accident occurrence point, a point under construction, and the like. The ECU 20 may acquire information indicating these points to be carefully noted from the navigation device 12. In addition, the navigation device 12 may acquire information indicating these points to be carefully noted by a vehicle Information and communication system (VICS, registered trademark), ETC 2.0, a mobile communication network, or the like. In this case, in step S22, the ECU 20 notifies the driver of information for urging safe driving. For example, as illustrated in FIG. 7, the ECU 20 may display, on the display 33, a message for urging safe driving with the correct posture because a frequent accident occurrence point exists up ahead, and may output, from the speaker 34, a voice for reading out the message.

As illustrated in a third row of the table of FIG. 5, in step S21, the ECU 20 (notification timing determination unit 25) determines whether the driver is in a conversation based on at least one of a result of analysis of a facial expression of the driver included in the image captured by the camera 31 in the vehicle and a result of analysis of the voice collected by the microphone 37 in the vehicle. Then, when it is determined that the driver is in a conversation, the ECU 20 determines that it is the timing to give the notification. For example, when opening and closing of the driver's mouth or the smile continues for a predetermined period (for example, several minutes) or more, as the result of the analysis of the facial expression, the ECU 20 determines that the driver is in a conversation. For example, when both voices of the driver and the passenger continue for a predetermined period (for example, several minutes) or more, as the result of the analysis of the collected voice, the ECU 20 determines that the driver is in a conversation. In this case, in step S22, the ECU 20 notifies the driver of information for urging the driver to concentrate on driving. For example, as illustrated in FIG. 8, the ECU 20 may display, on the display 33, a message for urging the driver to correct his/her posture and concentrate on driving, and may output, from the speaker 34, a voice for reading out the message.

In step S21, the ECU 20 (notification timing determination unit 25) may determine which of the first row to the third row of the table of FIG. 5 described above is, and may selectively notify the driver of an appropriate one of FIGS. 6 to 8 described above based on the determination result. Accordingly, the ECU 20 (notification timing determination unit 25) can give the appropriate notification according to a situation on the route and a situation of the driver.

SUMMARY OF THE PRESENT DISCLOSURE

The contents of the present disclosure can be expressed as in the following supplementary notes.

<Supplementary Note 1>

The driver monitoring device 10 includes the detection unit 21 configured to detect an unbalanced posture of a driver based on the image of the driver's seat of the vehicle captured by the camera 31, the determination unit 22 configured to determine whether the unbalanced posture of the driver detected by the detection unit 21 is a habitual unbalanced posture of the driver, the opening degree calculation unit 23 configured to, when the determination unit 22 determines that the unbalanced posture is other than the habitual unbalanced posture of the driver, calculate an opening degree of eyes of the driver based on the image, the notification timing determination unit 25 configured to, when the vehicle is traveling and the opening degree calculated by the opening degree calculation unit 23 is equal to or larger than the predetermined threshold value, determine whether it is a timing to perform the predetermined notification to the driver, and the notification unit configured to, when the notification timing determination unit 25 determines that it is the timing to give the notification, give the predetermined notification to the driver.

As a result, the driver monitoring device 10 can notify the driver of the predetermined notification at an appropriate timing even when the unbalanced posture is other than the habitual unbalanced posture of the driver, the opening degree of the eyes of the driver is equal to or larger than the predetermined threshold value, and the vehicle is traveling.

<Supplementary Note 2>

In the driver monitoring device 10 described in Supplementary Note 1, the notification timing determination unit 25 may determine that it is the timing to give the notification when a distance from the current position of the vehicle to a rest place present on a preset route on which the vehicle is scheduled to travel is less than the predetermined threshold value, and the notification unit may give, as the predetermined notification, a notification for urging the driver to take a rest at the rest place.

Accordingly, when the driver opens his/her eyes in a state of the unbalanced posture other than habitual unbalanced posture of the driver, the driver monitoring device 10 can appropriately give the notification for urging the driver to take a rest at the rest place at a timing at which the rest place is present at a position on the route where the distance from the current position of the vehicle to the rest place is less than a predetermined distance. Therefore, for example, when the unbalanced posture other than the habitual unbalanced posture of the driver occurs due to fatigue, the driver can receive the notification for urging him/her to take a rest at an appropriate timing.

<Supplementary Note 3>

In the driver monitoring device 10 described in Supplementary Note 1 or 2, the notification timing determination unit 25 may determine that it is the timing to give the notification when a distance from the current position of the vehicle to a place where attention needs to be paid to traveling present on a preset route on which the vehicle is scheduled to travel is less than the predetermined threshold value, and the notification unit may give, as the predetermined notification, a notification for urging the driver to perform safe driving.

Accordingly, when the driver opens his/her eyes in a state of the unbalanced posture other than habitual unbalanced posture of the driver, the driver monitoring device 10 can appropriately perform the notification for urging the safe driving at a timing at which a place where the driver should pay attention to traveling is present at a position on the route where the distance from the current position of the vehicle to the place is less than a predetermined distance. Therefore, for example, when the unbalanced posture other than the habitual unbalanced posture of the driver occurs due to fatigue or reduced attentiveness, the driver can receive the notification for urging safe driving at an appropriate timing.

<Supplementary Note 4>

In the driver monitoring device 10 according to any one of Supplementary Notes 1 to 3, the notification timing determination unit 25 may determine that it is the timing to give the notification when it is determined that the driver is in a conversation, as the result of the analysis of the facial expression of the driver included in the image, and the notification unit may give, as the predetermined notification, a notification for urging the driver to concentrate on driving.

As a result, the driver monitoring device 10 can appropriately give the notification for urging the driver to concentrate on the driving at a timing when the driver opens his/her eyes in a state of the unbalanced posture other than habitual unbalanced posture of the driver and is absorbed in the conversation. Therefore, for example, when the unbalanced posture other than the habitual unbalanced posture of the driver occurs due to the conversation, the driver can receive the notification for urging him/her to concentrate on the driving at an appropriate timing.

Although the embodiment has been described with reference to the accompanying drawings, the present disclosure is not limited thereto. It is apparent to those skilled in the art that various modifications, corrections, substitutions, additions, deletions, and equivalents can be conceived within the scope described in the claims, and it should be understood that such modifications, substitutions, additions, deletions, and equivalents also fall within the technical scope of the present disclosure. In addition, the constituent elements in the above-described embodiment may be combined as desired without departing from the scope of the invention.

The technology of the present disclosure is useful for improving driving safety of a vehicle.

This application is based on and claims priority under 35 USC 119 from Japanese Patent Application No. 2021-200980 filed on Dec. 10, 2021, the contents of which are incorporated herein by reference.

What is claimed is:

1. A driver monitoring device comprising:
   a processor; and
   a memory storing instructions that, when executed by the processor, cause the driver monitoring device to perform operations, the operations comprising:
   detecting an unbalanced posture of a driver based on an image of a driver's seat of a vehicle captured by a camera;
   determining whether the unbalanced posture of the driver is a habitual unbalanced posture of the driver;
   calculating an opening degree of at least one eye of the driver based on the image in a case in which it is determined that the unbalanced posture is other than the habitual unbalanced posture of the driver;
   determining whether it is a timing to give a notification to the driver in a case in which the vehicle is traveling and the opening degree is equal to or larger than a first threshold; and
   giving the notification to the driver in a case in which it is determined that it is the timing to give the notification.

2. The driver monitoring device according to claim 1, wherein the operations further comprise:
   determining that it is the timing to give the notification in a case in which a distance from a current position of the vehicle to a rest place present on a route on which the vehicle is scheduled to travel is less than a second threshold; and
   giving, as the notification, a first notification for urging the driver to take a rest at the rest place.

3. The driver monitoring device according to claim 1, wherein the operations further comprise:
   determining that it is the timing to give the notification in a case in which a distance from the current position of the vehicle to a place where attention needs to be paid to traveling present on a route on which the vehicle is scheduled to travel is less than a third threshold; and
   giving, as the predetermined notification, a second notification for urging the driver to perform safe driving.

4. The driver monitoring device according to claim 3, wherein the place where attention needs to be paid to traveling includes at least one of a frequent accident occurrence point, an accident occurrence point, and a point under construction.

5. The driver monitoring device according to claim 1, wherein the operations further comprise:
   determining that it is the timing to give the notification in a case in which it is determined that the driver is in a conversation as a result of analysis of a facial expression of the driver included in the image; and
   giving, as the notification, a third notification for urging the driver to concentrate on driving.

6. The driver monitoring device according to claim 1, further comprising:
   determining that it is the timing to give the notification in a case in which it is determined that the driver is in a conversation as a result of analysis of a voice collected by a microphone in the vehicle; and
   giving, as the notification, a third notification for urging the driver to concentrate on driving.

7. The driver monitoring device according to claim 1, wherein the determining whether it is a timing to give a notification to the driver is performed further in a case in which the vehicle is traveling and a state in which the opening degree is smaller than the first threshold continues for a period equal to or shorter than a fourth threshold.

8. A driver monitoring method comprising:
   detecting an unbalanced posture of a driver based on an image of a driver's seat of a vehicle captured by a camera;
   determining whether the unbalanced posture of the driver is a habitual unbalanced posture of the driver;
   calculating an opening degree of at least one eye of the driver based on the image in a case in which it is determined that the unbalanced posture is other than the habitual unbalanced posture of the driver;

determining whether it is a timing to give a notification to the driver in a case in which the vehicle is traveling and the opening degree is equal to or larger than a first threshold; and giving the notification to the driver in a case in which it is determined that it is the timing to give the notification.

9. The driver monitoring method according to claim 8, further comprising:

determining that it is the timing to give the notification in a case in which a distance from a current position of the vehicle to a rest place present on a route on which the vehicle is scheduled to travel is less than a second threshold; and giving, as the notification, a first notification for urging the driver to take a rest at the rest place.

10. The driver monitoring method according to claim 8, further comprising:

determining that it is the timing to give the notification in a case in which a distance from the current position of the vehicle to a place where attention needs to be paid to traveling present on a route on which the vehicle is scheduled to travel is less than a third threshold; and giving, as the predetermined notification, a second notification for urging the driver to perform safe driving.

11. The driver monitoring method according to claim 10, wherein the place where attention needs to be paid to traveling includes at least one of a frequent accident occurrence point, an accident occurrence point, and a point under construction.

12. The driver monitoring method according to claim 8, further comprising:

determining that it is the timing to give the notification in a case in which it is determined that the driver is in a conversation as a result of analysis of a facial expression of the driver included in the image; and giving, as the notification, a third notification for urging the driver to concentrate on driving.

13. The driver monitoring method according to claim 8, further comprising:

determining that it is the timing to give the notification in a case in which it is determined that the driver is in a conversation as a result of analysis of a voice collected by a microphone in the vehicle; and giving, as the notification, a third notification for urging the driver to concentrate on driving.

14. The driver monitoring method according to claim 8, wherein the determining whether it is a timing to give a notification to the driver is performed further in a case in which the vehicle is traveling and a state in which the opening degree is smaller than the first threshold continues for a period equal to or shorter than a fourth threshold.

15. A non-transitory computer-readable medium that stores a driver monitoring program, the driver monitoring program, when executed by a processor, causing a computer to perform a process, the process comprising:

detecting an unbalanced posture of a driver based on an image of a driver's seat of a vehicle captured by a camera;

determining whether the unbalanced posture of the driver is a habitual unbalanced posture of the driver;

calculating an opening degree of at least one eye of the driver based on the image in a case in which it is determined that the unbalanced posture is other than the habitual unbalanced posture of the driver;

determining whether it is a timing to give a notification to the driver in a case in which the vehicle is traveling and the opening degree is equal to or larger than a first threshold; and giving the notification to the driver in a case in which it is determined that it is the timing to give the notification.

\* \* \* \* \*